(12) United States Patent
Kumabayashi

(10) Patent No.: US 11,079,974 B2
(45) Date of Patent: Aug. 3, 2021

(54) SERVER, PRINTER, AND PROGRAM FOR PERFORMING RFID COMMUNICATION

(71) Applicant: SATO HOLDINGS KABUSHIKI KAISHA, Tokyo (JP)

(72) Inventor: Tomoyuki Kumabayashi, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/603,910

(22) PCT Filed: Jul. 19, 2018

(86) PCT No.: PCT/JP2018/027091
§ 371 (c)(1),
(2) Date: Oct. 9, 2019

(87) PCT Pub. No.: WO2019/130631
PCT Pub. Date: Jul. 4, 2019

(65) Prior Publication Data
US 2020/0125300 A1    Apr. 23, 2020

(30) Foreign Application Priority Data
Dec. 27, 2017 (JP) .............................. JP2017-251193

(51) Int. Cl.
*B41J 29/393* (2006.01)
*G06F 3/12* (2006.01)

(52) U.S. Cl.
CPC .......... *G06F 3/1204* (2013.01); *B41J 29/393* (2013.01); *G06F 3/1231* (2013.01); *B41J 2029/3937* (2013.01); *G06F 3/1255* (2013.01)

(58) Field of Classification Search
None
See application file for complete search history.

(56) References Cited

U.S. PATENT DOCUMENTS 7,190,270 B2    3/2007  Brown et al.
2006/0250252 A1* 11/2006  Nagai ................ G06K 17/00
                                                        340/572.7
(Continued)

FOREIGN PATENT DOCUMENTS

JP    2002-292899 A    10/2002
JP    2003-140548 A     5/2003
(Continued)

OTHER PUBLICATIONS

Machine Translation in English of JP Pub 2005-144729 to Yamakita Toru.*

(Continued)

*Primary Examiner* — Haris Sabah
(74) *Attorney, Agent, or Firm* — Foley & Lardner LLP

(57) ABSTRACT

A server, which is capable of communicating with a printer or printers, each performing radio frequency identification (RFID) communication with a RFID tag, contains: a record unit configured to record, in a memory device, printer identification information for identifying a printer, tag identification information for identifying a RFID tag, and communication parameters with which the printer performs RFID communication, in an associated manner; a first obtaining unit configured to obtain, from a printer, printer identification information and tag identification information read by the printer; an identifying unit configured to identify communication parameters associated with the printer identification information and the tag identification information obtained by the first obtaining unit; and a first transmission unit configured to transmit the communication parameters identified by the identifying unit, to the printer.

22 Claims, 19 Drawing Sheets

(56) References Cited

U.S. PATENT DOCUMENTS

| | | | |
|---|---|---|---|
| 2007/0138281 A1* | 6/2007 | Moriyama | B41J 3/4075 |
| | | | 235/451 |
| 2008/0130060 A1* | 6/2008 | Gotou | H04N 1/32106 |
| | | | 358/402 |
| 2009/0174893 A1* | 7/2009 | Fujii | G03G 15/5029 |
| | | | 358/1.15 |
| 2010/0060931 A1* | 3/2010 | Ichikawa | H04N 1/00342 |
| | | | 358/1.15 |
| 2017/0099397 A1* | 4/2017 | Ishido | H04N 1/32138 |

FOREIGN PATENT DOCUMENTS

| | | |
|---|---|---|
| JP | 2005-144729 A | 6/2005 |
| JP | 2005-280224 A | 10/2005 |

OTHER PUBLICATIONS

Machine Translation in English of JP Pub 2003-140548 to Kasayama Hiroshi.*

Extended European Search Report, Application No. 18895015.8, dated Jan. 22, 2021, 11 pages.

\* cited by examiner

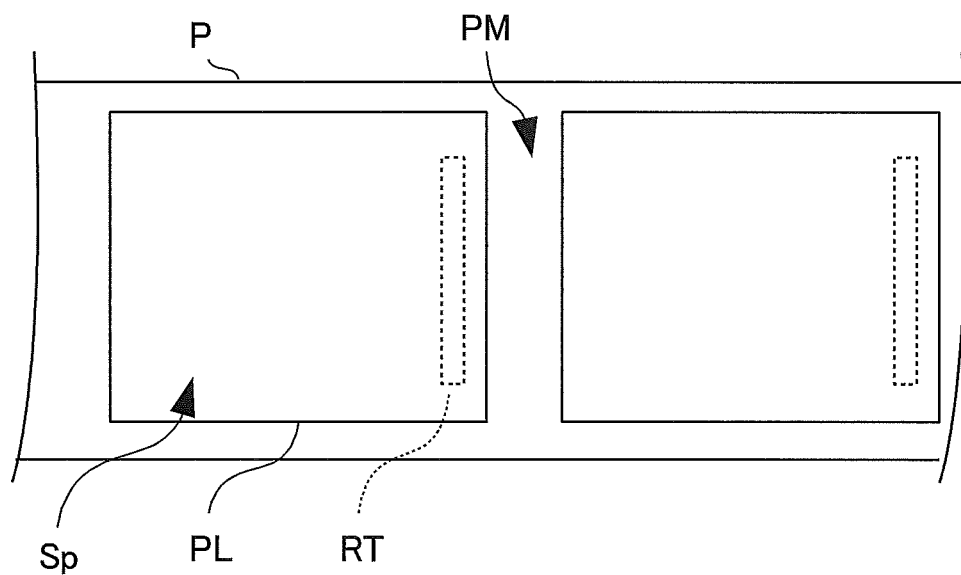
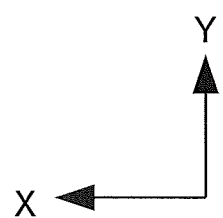
FIG.2

| User information database | | | | | |
|---|---|---|---|---|---|
| User ID | User name | Contact | User property | | Supply serial |
| | | | Business category | Use location | |
| U001 | Company A | U1@... | Food | Hokkaido | SS001 |
| | | | | | SS002 |
| U002 | Company B | U2@... | Painting | Okinawa | SS003 |
| ... | ... | ... | ... | ... | ... |

FIG.6

Printer master database

| Printer model ID | Model name | Printer serial | Supply ID | Communication parameters | | | | | | Print parameter | |
|---|---|---|---|---|---|---|---|---|---|---|---|
| | | | | Write parameters | | | Read parameters | | | | |
| | | | | Feed distance [mm] | Feed speed for communi-cation [inch/sec] | Electro-magnetic wave level [dB] | Feed distance [mm] | Feed speed for communi-cation [inch/sec]] | Electro-magnetic wave level [dB] | Print density | Feed speed for printing |
| PRT001 | PRT1 | 100001 | SUP001 | 5 | 5 | 80 | 5 | 6 | 60 | 5 | 60 |
| | | 100002 | SUP002 | 4 | 8 | 75 | 3 | 9 | 70 | 4 | 70 |
| | | ⋮ | ⋮ | ⋮ | ⋮ | ⋮ | ⋮ | ⋮ | ⋮ | ⋮ | ⋮ |
| PRT002 | PRT2 | 200001 | SUP001 | 6 | 6 | 90 | 7 | 8 | 50 | 8 | 50 |
| | | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ |

| Supply master database | | | | | | | | | |
|---|---|---|---|---|---|---|---|---|---|
| Supply ID | Supply name | Supply serial | Tag ID | Supply property | | | | | |
| | | | | Label property | Label size | Chip maker | Chip type | Inlay maker | Inlay type | Application |
| SUP001 | Type I | SS001 | TID101<br>TID102<br>... | ... | P20mm x W75mm | C1 | CTYPE1 | IN1 | INTYPE1 | Price tag |
| | | SS002 | TID111<br>TID112<br>... | | | | | | | |
| | | ... | ... | | | | | | | |
| SUP002 | Type II | SS101 | TID201<br>TID202<br>... | ... | P100mm x W75mm | C2 | CTYPE2 | IN2 | INTYPE2 | Ticket |
| | | SS102 | TID211<br>TID212<br>... | | | | | | | |
| | | ... | ... | ... | | | | | | ... |
| ... | ... | | | | | | | | | |

Printer information database
(User ID=U001)

| Printer serial | Printer model ID | Optional configuration | | | Read log | | Write log | | Error | | |
|---|---|---|---|---|---|---|---|---|---|---|---|
| | | Cutter unit ID | Separation unit ID | Wireless communication unit ID | Supply serial | Read frequency | Supply serial | Write frequency | Error occurrence date | Supply serial | Error code |
| 123456 | PRT001 | CUT001 | NONE | W001 | SS001 SS002 | 60 45 | SS001 | 80 | 2017/8/1 10:00 2017/8/2 21:23 | SS001 SS002 | E001 E002 |
| 234567 | PRT001 | CUT002 | NONE | W001 | SS002 | 80 | SS002 | 90 | 2017/8/31 05:18 | SS002 | E001 |
| 345678 | PRT002 | CUT002 | SEP001 | W002 | SS003 | 30 | SS003 | 20 | NONE | NONE | NONE |
| ... | ... | ... | ... | ... | ... | ... | ... | ... | ... | ... | ... |

FIG.9

Printer master database

| Printer model ID | Model name | Printer serial | Supply ID | User property | | | Communication parameters | Print parameters |
|---|---|---|---|---|---|---|---|---|
| | | | | Business category | Use location | | | |
| PRT001 | PRT1 | 100001 | SUP001 | Food | Hokkaido | | ⋯ | ⋯ |
| | | 100002 | | | Okinawa | | ⋯ | ⋯ |
| | | 100003 | | | ⋯ | | ⋯ | ⋯ |
| | | 100004 | | Painting | Hokkaido | | ⋯ | ⋯ |
| | | 100005 | | | Okinawa | | ⋯ | ⋯ |
| | | 100006 | | | ⋯ | | ⋯ | ⋯ |
| | | 100007 | | ⋯ | ⋯ | | ⋯ | ⋯ |
| | | 100008 | SUP002 | ⋯ | ⋯ | | ⋯ | ⋯ |
| | | 100009 | | | | | | |
| | | ⋯ | ⋯ | | | | | |
| ⋯ | ⋯ | ⋯ | ⋯ | | | | | ⋯ |

FIG.15

Printer master database

| Printer model ID | Model name | Printer serial | Supply ID | Optional configuration | | Communication parameters | Print parameters |
|---|---|---|---|---|---|---|---|
| PRT001 | PRT1 | 100001 | SUP001 | Cutter unit ID | CUT001 | ... | ... |
| | | 100002 | | Separation unit ID | SEP001 | ... | ... |
| | | 100003 | | Wireless communication unit ID | W001 | | |
| | | 100004 | | | | | |
| | | 100005 | | | | | |
| | | 100006 | SUP002 | ... | | ... | ... |
| ... | ... | ... | ... | ... | | ... | ... |

FIG.16

| Printer master database | | | | Communication parameters | | | Read parameters | | | Print parameters | |
|---|---|---|---|---|---|---|---|---|---|---|---|
| Printer model ID | Model name | Printer serial | Tag ID | Write parameters | | | | | | | |
| | | | | Feed distance for communication | Feed speed for communication | Electro-magnetic wave level | Feed distance | Feed speed for communication | Electromagnetic wave level | Print density | Feed speed for printing |
| PRT001 | PRT1 | 100001 | TID001 | 5 | 10 | 80 | 5 | 6 | 85 | 5 | 60 |
| | | 100002 | TID002 | | | | | | | | |
| | | ⋅ | ⋅ | | | | | | | | |
| | | | TID101 | 4 | 8 | 75 | 3 | 6 | 70 | 4 | 70 |
| | | | TID102 | | | | | | | | |
| | | | ⋅ | ⋅ | ⋅ | ⋅ | ⋅ | ⋅ | ⋅ | ⋅ | ⋅ |
| PRT002 | PRT2 | 200001 | SUP001 | 6 | 8 | 90 | 7 | 4 | 50 | 8 | 50 |
| | | 200002 | | | | | | | | | |
| | | ⋅ | ⋅ | ⋅ | ⋅ | ⋅ | ⋅ | ⋅ | ⋅ | ⋅ | ⋅ |
| ⋅ | ⋅ | ⋅ | ⋅ | ⋅ | ⋅ | ⋅ | ⋅ | ⋅ | ⋅ | ⋅ | ⋅ |

FIG.19

SERVER, PRINTER, AND PROGRAM FOR PERFORMING RFID COMMUNICATION

The present invention relates to a server, a printer, and a program.

BACKGROUND ART

In recent years, printers are prevalent which has a printing function for printing print information on a print medium and a communicating function for performing communication with a Radio Frequency Identification (RFID) tag contained in the print medium (which is hereinafter called "RFID communication"). See the specification of the U.S. Pat. No. 7,190,270, for example.

With these printers, calibration is generally performed for setting communication parameters used in RFID communication to, before the RFID communication is performed, and then a user operates to set communication parameters based on a calibration result.

SUMMARY OF THE INVENTION

Problems to be Solved by the Invention

However, setting parameters by a user requires experiences and much work. Further, setting parameters manually may cause a mistake such as erroneous setting. Thus, proper communication parameters setting for RFID communication has not been easy.

In view of the above, the present invention aims to enable proper communication parameters setting for RFID communication in an easy manner.

Means for Solving the Problems

An embodiment of the present invention is a server capable of communicating with a printer or printers, each performing radio frequency identification (RFID) communication with a RFID tag, the server comprising: a record unit configured to record, in a memory device, printer identification information for identifying a printer, tag identification information for identifying a RFID tag, and communication parameters with which the printer performs RFID communication, in an associated manner; a first obtaining unit configured to obtain, from a printer, printer identification information and tag identification information read by the printer; an identifying unit configured to identify communication parameters associated with the printer identification information and the tag identification information obtained by the first obtaining unit; and a first transmission unit configured to transmit the communication parameters identified by the identifying unit, to the printer.

Effect of the Invention

According to an embodiment of the present invention, it is enabled proper communication parameters setting for RFID communication in an easy manner.

BRIEF DESCRIPTION OF THE DRAWINGS

FIG. 2 is a schematic view of the print medium in FIG. 1.

FIG. 6 illustrates a data structure of a user information database of the present embodiment.

FIG. 7 illustrates a data structure of a printer master database of the present embodiment.

FIG. 8 illustrates a data structure of a supply master database of the present embodiment.

FIG. 9 illustrates a data structure of a printer information database of the present embodiment.

FIG. 15 illustrates a data structure of a printer master database of a modified example 1.

FIG. 16 illustrates a data structure of a printer master database of a modified example 2.

FIG. 19 illustrates a data structure of a printer master database of a modified example 5.

DETAILED DESCRIPTION OF THE INVENTION

Figure 1:
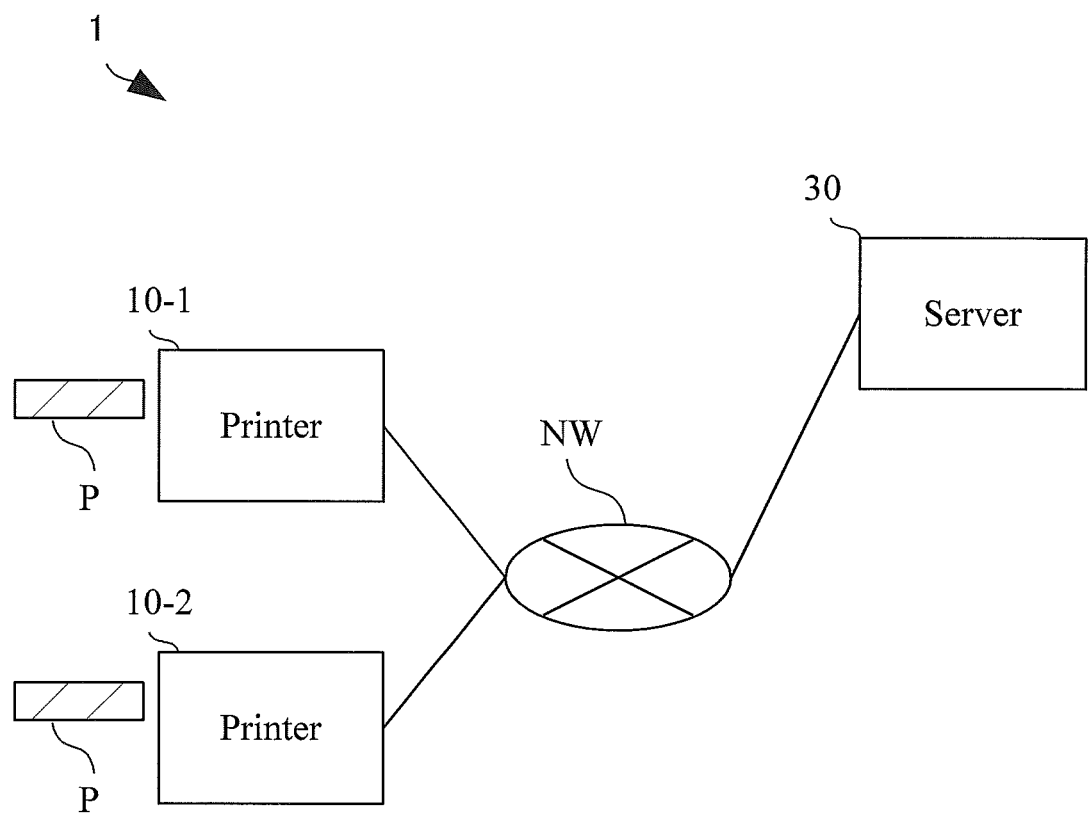
FIG. 1 is a schematic view of an information processing system according to the present embodiment.

The present invention relates to a Japanese patent application 2017-251193 filed before Japan Patent Office on Dec. 27, 2017, entire content of which is incorporated by reference in the specification of the present application.

An embodiment of the present invention will be described in detail hereinafter with reference to the attached drawings. In the drawings for explaining the present embodiment, an identical sign will be generally denoted regarding the corresponding element, and thus repeated explanation will be omitted for the corresponding element.

(1) Configuration of Information Processing System

A configuration of an information processing system will be described. FIG. 1 is a schematic view of the information processing system according to the present embodiment. FIG. 2 is a schematic view of the print medium in FIG. 1.

As illustrated in FIG. 1, the information processing system 1 includes a plurality of printers 10-1, 10-2 and a server 30. In the following description, each of a printer 10-1 and a printer 10-2 may be denoted as "printer 10" unless the printers are particularly discerned.

The printer 10 and the server 30 are connected through a network NW such as Internet or an intranet.

As illustrated in FIG. 2, a print medium P contains a mount PM, a plurality of labels PL, and a plurality of RFID tags RT, each of which is embedded in each label PL.

An upper face of each label PL is a print face Sp on which printing can be performed by the printer 10. Each label PL is temporarily attached to the mount PM, with a predetermined interval, along a feeding direction (namely, X-direction) of the print medium P.

The printer 10 of FIG. 1 has a printing function for printing print information on the label PL and a communicating function for performing RFID communication. The RFID communication according to the present embodiment includes communication for writing information on an Integrated Circuit (IC) chip of the RFID tag RT and communication for reading information from the RFID tag RT. The printer 10 is a thermal printer, for example.

The server 30 is an example of an information processing apparatus that provides the printer 10 with a response regarding a request transmitted from the printer 10. For example, the server 30 may be a web-server, and may be a program or a computer configured to perform HTTP communication with a software on the printer side.

(1-1) Configuration of Printer

Figure 3:
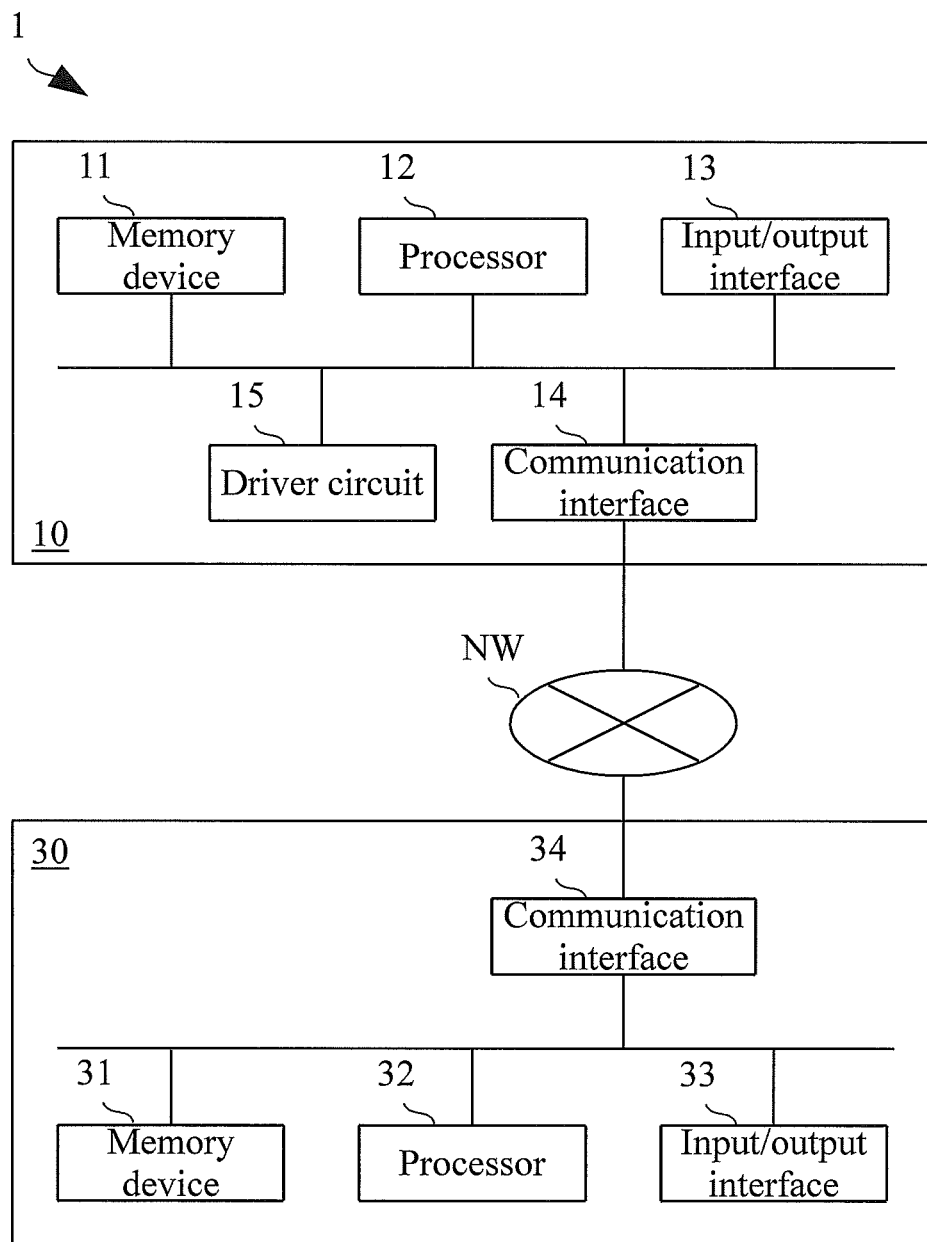
FIG. 3 is a block diagram showing a configuration of the information processing system of FIG. 1.
Figure 4:
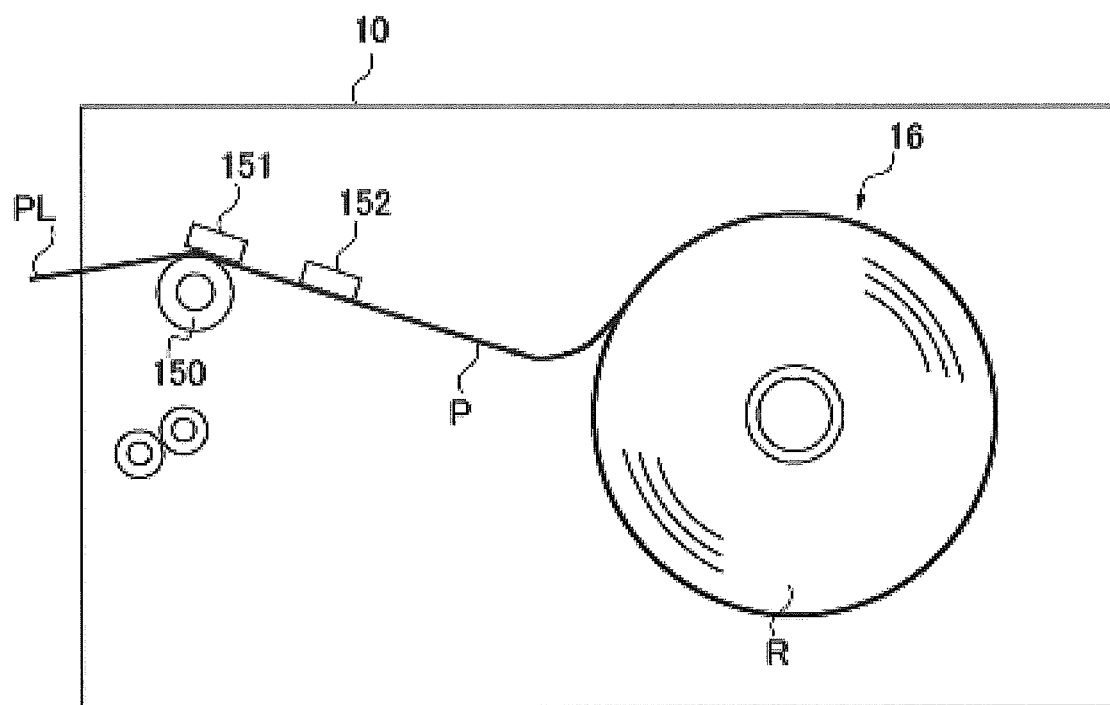
FIG. 4 is a schematic view showing an internal arrangement of the printer of FIG. 3.

A configuration of the printer 10 will be described. It is to be noted that, for convenience, a configuration will be exemplified in which the only one printer 10 and the server 30 are connected. FIG. 3 is a block diagram showing a configuration of the information processing system of FIG. 1. FIG. 4 is a schematic view showing an internal configuration of the printer of FIG. 3. FIG. 5 is a schematic view showing optional configurations of the printer of FIG. 4.

As illustrated in FIG. 2, the printer 10 may include: a memory device 11, a processor 12, an input/output interface 13, a communication interface 14, and a driver circuit 15, for example.

The memory device 11 is configured to memorize program(s) and data. The memory device 11 may be a combination of a read-only memory (ROM), a random access memory (RAM), and a storage such as a flash memory or a hard disk.

The program(s) in the memory device 11 may include:
Operating system (OS);
Firmware for controlling each component of the printer 10; and
Application programs of the printer 10.
The data in the memory device 11 may include:
Databases accessed when information processing is executed;
Data obtained through an execution result of information processing (namely, an execution result of information processing, per se);
Parameters read by the firmware; and
Printer information regarding the printer (a printer serial code assigned to the printer 10, for example).

The processor 12 is configured to initiate the program(s) in the memory device 11 to realize the functions of the printer 10. The processor 12 is an example of a computer.

The input/output interface 13 is configured to obtain a user instruction from an input device connected to the printer 10 and to output information to an output device connected to the printer 10. The input device may be physical button(s), a touch panel, or combination thereof, for example. The output device may be a display device, for example.

The communication interface 14 is configured to control communication between the printer 10 and the server 30.

The driver circuit 15 is configured to generate a drive signal for driving each component of the printer 10.

As illustrated in FIG. 4, a platen roller 150, a thermal head 151, a reader/writer 152, and a storage 16 are disposed in the printer 10.

A paper roll R is stored in the storage 16. The front end of the paper roll R is pinched by the platen roller 150 and the thermal head 151. The platen roller 150 rotates in accordance with a drive signal generated by the driver circuit 15 to feed the belt-shaped print medium P extracted from the paper roll R, which is stored in the storage 16.

The thermal head 151 is heated in accordance with a drive signal generated by the driver circuit 15 to print print information on the label PL of the print medium P fed by the platen roller 150.

The reader/writer 152 is configured to perform RFID communication in accordance with a drive signal generated by the driver circuit 15.

Figure 5A:
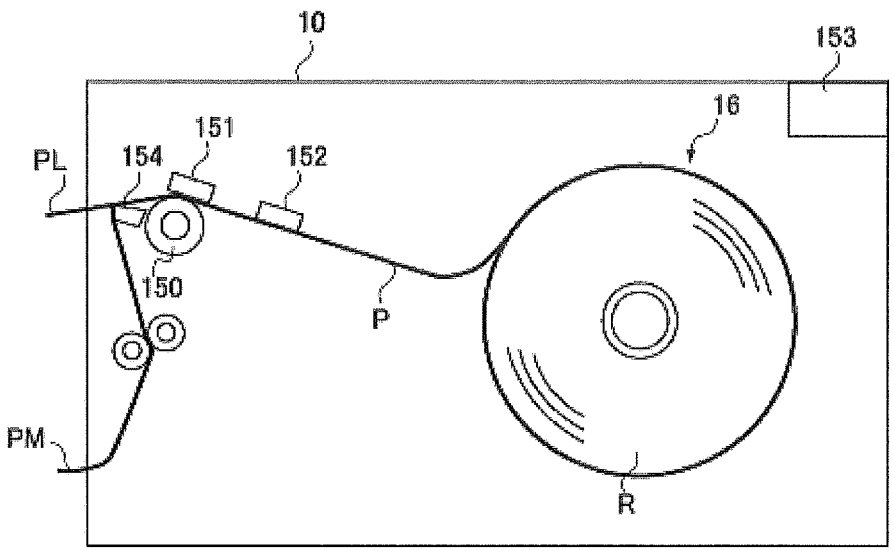
FIG. 5 is a schematic view showing optional arrangements of the printer of FIG. 4.

FIG. 5A indicates an optional arrangement of the printer 10 having a separation issuance function. With the separation issuance function, the label PL on which print information is printed is separated from the mount PM and ejected to the outside of the printer 10.

As illustrated in FIG. 5A, a separation unit 154 is disposed in the printer 10, in addition to the components shown in FIG. 4.

The separation unit 154 is configured to separate the label PL from the mount PM by diverging a feed path of the label PL on which print information is printed by the thermal head 151, from a feed path of the mount PM.

Figure 5B:
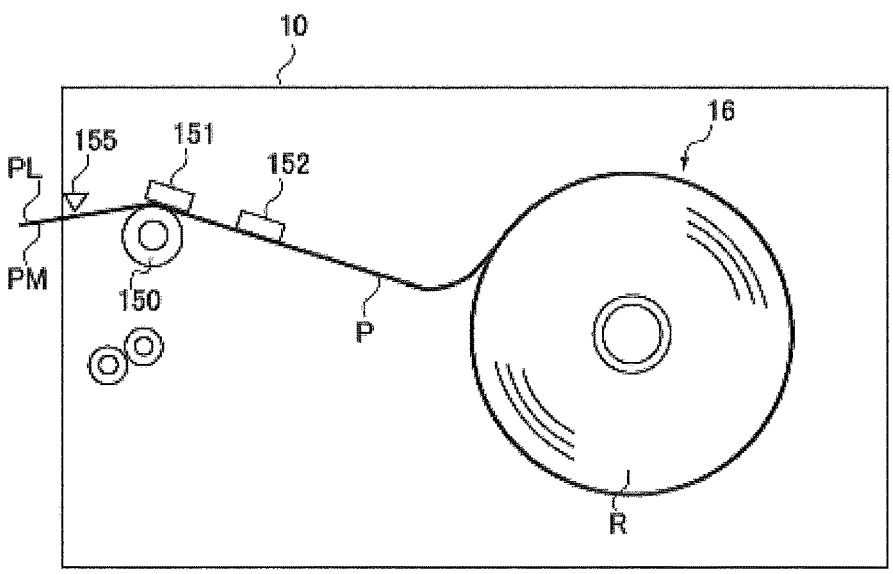

FIG. 5B indicates an optional arrangement of the printer 10 having a continuous issuance function. With the continuous issuance function, the label PL on which print information is printed is ejected to the outside of the printer 10, with a number of labels PL temporarily attached to the mount PM.

As illustrated in FIG. 5B, a cutter unit 155 is disposed in the printer 10, in addition to the components shown in FIG. 4.

The cutter unit 155 is configured to cut the mount PM in accordance with a drive signal generated by the driver circuit 15, at a position of the mount PM between a number of labels PL on which print information are printed by the thermal head 151 and a label PL on which print information is not printed.

Figure 5C:
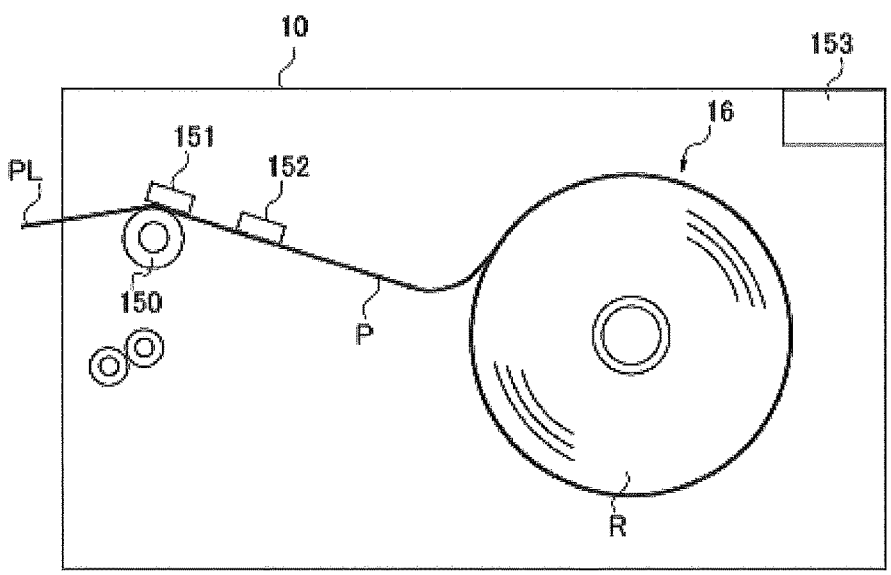

FIG. 5C indicates an optional arrangement of the printer 10 having a wireless communication function. With the wireless communication function, wireless communication is performed with the server 30, for example, via the network NW.

As illustrated in FIG. 5C, a wireless communication unit 153 is disposed in the printer 10, in addition to the components shown in FIG. 4.

The wireless communication unit 153 is connected to the communication interface 14. The wireless communication unit 153 establishes communication between the printer 10 and the server 30 in accordance with a control of the processor 12.

(1-2) Arrangement of Server

A configuration of the server 30 will be described.

As illustrated in FIG. 3, the server 30 may include: a memory device 31, a processor 32, an input/output interface 33, and a communication interface 34, for example.

The memory device 31 is configured to memorize program(s) and data. The memory device 31 may be a combination of a ROM, a RAM, and a storage such as a flash memory or a hard disk.

The program(s) in the memory device 31 may include:
Operating system (OS); and
Application programs for executing information processing.

The data in the memory device 31 may include:
Database accessed when information processing is executed; and
Execution result of information processing.

The processor 32 is configured to initiate the program(s) in the memory device 31 to realize the functions of the server 30. The processor 32 is an example of a computer.

The input/output interface 33 is configured to obtain an user instruction from an input device connected to the server 30 and to output information to an output device connected to the server 30. Then input device may be a keyboard, a pointing device, a touch panel, or combination thereof, for example. The output device may be a display device, for example.

The communication interface 34 is configured to control communication between the server 30 and the printer 10.

(2) Databases

Databases of the present embodiment will be described. The databases described below is memorized in the memory device 31.

(2-1) User Information Database

A user information database of the present embodiment will be described. FIG. 6 illustrates a data structure of the user information database of the present embodiment.

The user information database of FIG. 6 includes user information regarding users. The user information database contains: a "User ID" field; a "User name" field; a "Contact" field; a "User property" field; and a "Supply serial" field.

The "User ID" field holds a user ID (an example of "user identification information") for identifying a user. The user ID is arbitrarily determined by the server 30 when the user ID is registered in the server 30.

The "User name" field holds information regarding a user name (a text, for example). The user name is arbitrarily determined by the server 30 when the user information is registered in the server 30.

The "Contact" field holds information regarding user contact information such as a mail address, an account for login to the server 30, or a combination thereof.

The "User property" field holds user property information regarding user property. The "User property" field includes a "Business category" field and a "Use location" field. The user property information is arbitrarily determined by the server 30 when the user information is registered in the server 30. The "Business category" field holds information regarding the user's business category. The "Use location" field holds information regarding a use location of the printer 10.

The "Supply serial" field holds supply serial information for identifying a print medium P that the user possesses. The information held by the "Supply serial" field is updated when the user purchases a print medium P or the user has used up a print medium P.

(2-2) Printer Master Database

A printer master database of the present embodiment will be described. FIG. 7 illustrates a data structure of a printer master database of the present embodiment.

The printer master database of FIG. 7 includes communication parameters for each combination of a printer model ID and a supply ID. The printer master database is recorded in the memory device 31.

The printer master database contains: a "Printer model ID" field; a "Model name" field; a "Printer serial" field; a "Supply ID" field; a "Communication parameters" field; and a "Print parameters" field.

The "Printer model ID" field holds a printer model ID (an example of "printer identification information") for identifying a printer.

The "Model name" field holds information regarding a printer model name (a text, for example).

The "Printer serial" field holds a printer serial code (an example of printer identification information), which is unique for each printer 10. A unique printer serial code is assigned to each of a plurality of printers 10 identified with a printer model ID. A printer serial code assigned to each printer 10 is recorded in the memory device 11.

The "Supply ID" field holds a supply ID (an example of "print medium identification information") for identifying a model number of a print medium P.

The "Communication parameters" field holds communication parameters for the printer 10 to perform RFID communication. The communication parameters are optimized values which have been set, for each combination of a printer model and a type of a print medium P, in quality inspection included in a manufacturing process of the RFID tag RT.

The "Communication parameters" field includes a "Write parameters" field and a "Read parameters" field. The "Write parameters" field holds write parameters which are referred to in RFID communication for writing information on the IC chip of the RFID tag RT (which is hereinafter called "write communication"). The "Read parameters" field holds read parameters which are referred to in RFID communication for reading information from the IC chip of the RFID tag RT (which is hereinafter called "read communication").

Each of the "Write parameters" field and the "Read parameters" field contains: a "Feed distance" field; a "Feed speed for communication" field; and an "Electromagnetic wave level" field.

Each "Feed distance" field holds information regarding a feed distance required to reach a communication area (namely, a communication position) where the RFID tag RT can communicate with the reader/writer 152, in write communication or read communication. Such information may be a value in millimeter of a feed distance, for example.

Each "Feed speed for communication" field holds information regarding a speed of the print medium P when the RFID tag RT passes the communication area (that is, a feed speed for communication), in write communication or read communication. Such information may be a value in inch per second of a feed speed for communication, for example.

Each "Electromagnetic wave level" field holds information regarding intensity of electromagnetic wave emitted by the reader/writer 152 in write communication or read communication. Such information may be a value in dB of an electromagnetic wave level, for example.

The "Print parameters" field holds printer parameters referred to in printing print information on the label PL. The "Print parameters" field includes a "Print density" field and a "Feed speed for printing" field.

The "Print density" field holds information regarding a print density of print information. Such information may be a value of a temperature of the thermal head 151 or a voltage applied to the thermal head 151, for example.

The "Feed speed for printing" field holds information regarding a feed speed of the print medium P when the print medium P is printed.

Control for the RFID communication may be optimized based on a combination of a printer model and a type of the print medium P. Further, the RFID communication may be influenced by a configuration of the printer 10 such as a metal material used in the printer or a configuration of the print medium P such as label property of a paper substrate. Since the memory device 31 records communication parameters for each combination of a printer model ID and a supply ID, communication parameters can be provided to the printer 10 in accordance with a printer model of the printer 10 and a type of a print medium P stored in the printer 10.

(2-3) Supply Master Database

A supply master database of the present embodiment will be described. FIG. 8 illustrates a data structure of a supplies master database of the present embodiment.

The supply master database of FIG. 8 includes supply information regarding a print medium P containing a RFID tag RT. The supply master database is recorded in the memory device 31.

The supply master database contains: a "Supply ID" field; a "Supply name" field; a "Supply serial" field; a "Tag ID" field; and a "Supply property" field.

The "Supply ID" field holds a supply ID for identifying a model number of a print medium P.

The "Supply name" field holds information regarding a model name of the print medium P (a text, for example).

The "Supply serial" field holds supply serial information (an example of "print medium identification information"), which is unique for each print medium P containing a RFID tag RT. One or a plurality of supply serial information is associated with a single supply ID.

The "Tag ID" field holds a tag ID (an example of "tag identification information") for identifying a RFID tag RT.

The "Supply property" field holds supply property information (an example of "print medium property information") regarding a property of the print medium P. The "Supply property" contains: a "Label property" field; a "Label size" field; a "Chip maker" field; a "Chip type" field; an "Inlay maker" field; an "Inlay type" field; and an "Application" field.

The "Label property" field holds label property information regarding a property of a label PL. An example of the label property information may be: information regarding manufacturing date of the label PL; information regarding manufacturing plant of the label PL; information regarding material of the label PL such as material of a paper substrate and adhesive; information regarding a printer 10 suitable for use of the label PL; and information regarding resolution suitable for printing on the label PL.

The "Label size" field holds information regarding a label size of the label PL in the print medium P such as a longitudinal length P and a lateral length W.

The "Chip maker" field holds information regarding a manufacturer of the IC chip of the RFID tag RT.

The "Chip type" field holds information regarding a type of the IC chip. The "Inlay maker" field holds information regarding a manufacturer of an inlay of the RFID tag RT.

The "Inlay type" field holds information regarding a type of the inlay.

The "Application" field holds information regarding an application of the RFID tag RT such as "price label" or "ticket page."

(2-4) Printer Information Database

A printer information database of the present embodiment will be described. FIG. 9 illustrates a data structure of a printer information database of the present embodiment.

The printer information database of FIG. 9 contains printer information regarding a printer 10 registered by a user.

The printer information database contains: a "Printer serial" field; a "Printer model ID" field; an "Optional arrangement" field; a "Read log" field; a "Write log" field; and an "Error" field. The printer information database is associated with a user ID.

The "Printer serial" field holds a printer serial code unique for each printer 10. An unique printer serial code is assigned to each of the plurality of printer 10 identified by a printer model ID.

The "Printer model ID" field holds a printer model ID of the printer 10 to which a printer serial code is assigned.

The "Optional arrangement" field holds optional arrangement information regarding an optional arrangement of the printer 10. The "Optional arrangement" field includes a "Cutter unit ID" field, a "Separation unit ID" field, and a "Wireless communication unit ID" field.

The "Cutter unit ID" field holds a cutter unit ID for identifying a cutter unit 155 attached to the printer 10.

The "Separation unit ID" field holds a separation unit ID for identifying a separation unit 154 attached to the printer 10.

The "Wireless communication unit ID" field holds a wireless communication unit ID for identifying a wireless communication unit 153 attached to the printer 10.

The "Read log" field holds log information for read communication. The "Read log" field includes a "Supply serial" field and a "Read frequency" field.

The "Supply serial" field holds supply serial information of the print medium P containing a RFID tag RT targeted for read communication.

The "Read frequency" field holds information regarding a frequency of performing read communication.

The "Write log" field holds log information for write communication. The "Write log" field includes a "Supply serial" field and a "Write frequency" field.

The "Supply serial" field holds supply serial information of the print medium P containing a RFID tag RT targeted for write communication.

The "Write frequency" field holds information regarding a frequency of performing write communication.

The "Error" field holds error information regarding errors in RFID communication. The "Error" field includes an "Error occurrence date" field, a "Supply serial" field, and an "Error code" field.

The "Error occurrence date" field holds information regarding an error occurrence date.

The "Supply serial" field holds supply serial information of the print medium P containing a RFID tag RT that have been used in RFID communication when an error occurred.

The "Error code" field holds error code(s) indicating error type(s).

(3) Functional Block

Figure 10:
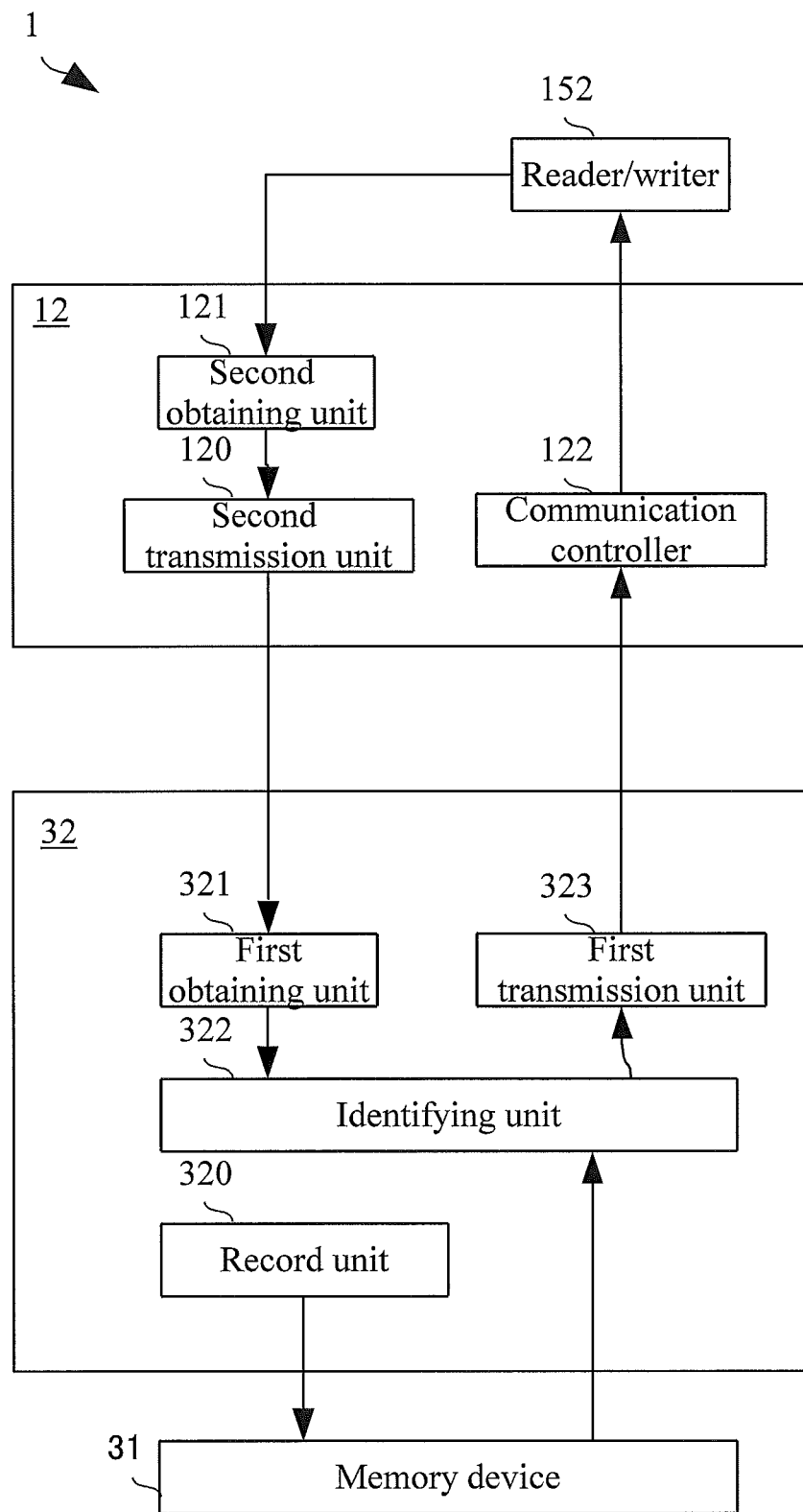
FIG. 10 is a functional block diagram of the server of FIG. 1.

A functional block according to the present embodiment will be described with reference to FIG. 10. FIG. 10 is a functional block diagram of the server and the printer of FIG. 1.

As shown in FIG. 10, the processor 32 of the server 30 functions as a record unit 320, a first obtaining unit 321, an identifying unit 322, and a first transmission unit 323. The processor 12 of the printer 10 functions as a second transmission unit 120, a second obtaining unit 121, and a communication controller 122.

The record unit 320 of the server 30 is configured to associate printer identification information (a printer model ID, for example) for identifying a printer 10 and print medium identification information (a supply ID, for example) for identifying a print medium P having a plurality of RFID tags RT, with communication parameters with which the printer 10 performs RFID communication, and record them in the memory device 31 in an associated manner.

The record unit 320 of the server 30 is configured to associate tag identification information (a tag ID, for example) for identifying a RFID tag RT, with print medium identification information, and record them in the memory device 31 in an associated manner.

The second obtaining unit 121 of the printer 10 is configured to obtain printer identification information assigned to the printer 10, and tag identification information of the RFID tag RT contained in the print medium stored in the storage 16.

The second transmission unit 120 of the printer 10 is configured to transmit the printer identification information and the tag identification information, which have been obtained by the second obtaining unit 121, to the server 30.

The first obtaining unit 321 of the server 30 is configured to obtain the printer identification information and the tag identification information, which have been transmitted by the second transmission unit 120 of the printer 10.

The identifying unit 322 of the server 30 is configured to access the memory device 31 to identify print medium identification information associated with the tag identification information that have been obtained by the first obtaining unit 321.

Additionally, the identifying unit 322 of the server 30 is configured to identify communication parameters associated with the print medium identification information, which have been identified, and the printer identification information that have been obtained by the first obtaining unit 321.

The first transmission unit 323 of the server 30 is configured to transmit the communication parameters that have been identified by the identifying unit 322, to the printer 10.

The second obtaining unit 121 of the printer 10 is configured to obtain the communication parameters that have been transmitted by the first transmission unit 323 of the server 30.

The communication controller 122 of the printer 10 is configured to control the reader/writer 152 with reference to the communication parameters that have been obtained by the second obtaining unit 121, and to perform RFID communication in accordance with the communication parameters.

As described above, the server 30 transmits communication parameters in accordance with a combination of a printer 10 and a RFID tag RT, to the printer 10. The printer 10 refers to the communication parameters that have been transmitted by the server 30, without performing calibration, and performs RFID communication. This allows proper communication parameters to be easily configured for RFID communication.

(4) Information Processing

Information processing according to the present embodiment will be described.

(4-1) RFID Communication Processing

Figure 11:
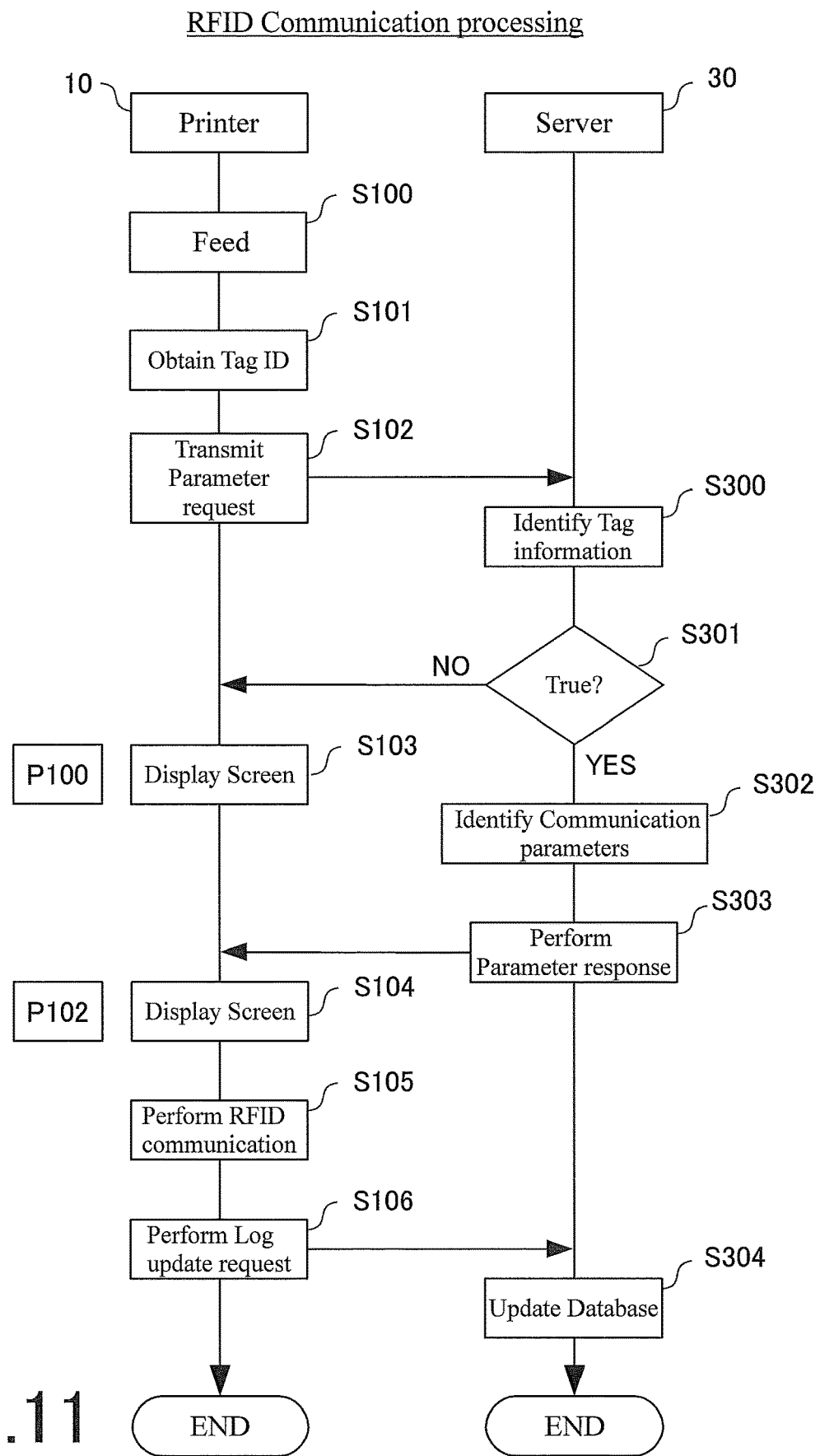
FIG. 11 is a sequence chart of RFID communication processing of the present embodiment.

RFID communication processing according to the present embodiment will be described. FIG. 11 is a sequence chart of RFID communication processing of the present embodiment. FIG. 12 illustrates an example of a screen displayed during the processing of FIG. 11.

It should be noted that RFID communication processing of FIG. 11 is similarly performed irrespective of a type of RFID communication (namely, read communication or write communication).

As shown in FIG. 11, the printer 10 performs feeding (S100). Specifically, a user opens a printer cover and sets a paper roll R in the storage 16. Then, the user closes the printer cover and gives the printer 10 a user instruction for performing RFID communication.

The driver circuit 15 generates a drive signal for the platen roller 150 to rotate the platen roller 150. Thereby, a belt-shaped print medium P is extracted from the paper roll R in the storage 16.

After the step S100, the printer 10 obtains a tag ID (S101). Specifically, the reader/writer 152 reads a tag ID recorded in the top RFID tag RT among a plurality of RFID tags RT that is fed by the platen roller 150, in accordance with control of the communication controller 122.

After the step S101, the printer 10 performs a parameter request (S102). Specifically, the second obtaining unit 121 of the printer 10 obtains: the tag ID read by the reader/writer 152 at the step S101; and a printer serial code recorded in the memory device 11.

The second transmission unit 120 of the printer 10 transmits parameter request data to the server 30. The parameter request data includes the following information:
  Printer serial code obtained by the second obtaining unit 121 of the printer 10 at the step S101; and
  Tag ID obtained by the second obtaining unit 121 at the step S101.

After the step S102, the server 30 performs identifying tag information (S300). Specifically, the identifying unit 322 of the server 30 accesses the supply master database (see FIG. 8) to identify: information regarding a supply name in the "Supply name" field associated with the tag ID in the parameter request data; supply serial information in the "Supply serial" field; and supply property information in the "Supply property" field.

The server 30 matches the tag ID obtained from the printer 10 at the step S300, to the tag IDs recorded in the supply master database (see FIG. 8), and determines true or false regarding the RFID tag (S301).

Specifically, if, at the step S300, the tag ID in the parameter request data is not contained in the supply master database (see FIG. 8), the processor 32 determines that the RFID tag used in the communication is false (NO in S301). In this case, the server 30 transmits false notification data to the printer 10. The false notification data includes a message indicating that the RFID tag is false.

If, at the step S300, the tag ID in the parameter request data is contained in the supply master database (see FIG. 8), the processor 32 determines that the RFID tag used in the communication is true (YES in S301), and proceeds to identifying communication parameters (S302).

The processor 32, which performs the step S301, functions as a determination unit for determining true or false of the RFID tag by matching the tag ID that have been obtained by the first obtaining unit 321, to the tag IDs recorded in the memory device 31.

If the RFID tag is determined to be false at the step S301 (NO at S301), the printer 10 performs displaying (S103). Specifically, the processor 12 is configured to display a screen P100 (see FIG. 12A) on the display device, in response to the false notification data that have been transmitted from the server 30 at the step S301.

Figure 12A:
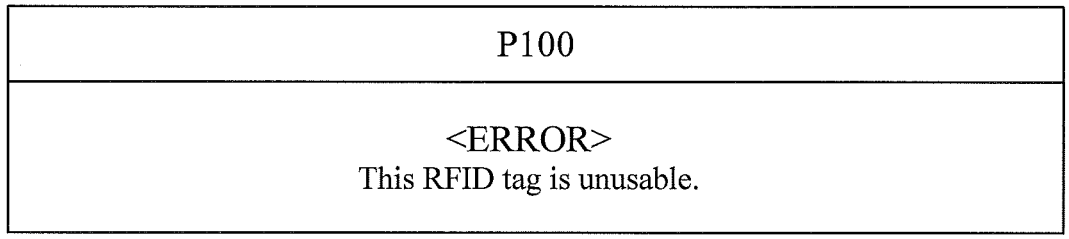
FIG. 12 illustrates an example of a screen displayed during the processing of FIG. 11.

As illustrated in FIG. 12A, the screen P100 includes a message indicating that the RFID tag RT is false.

If, at the step S301, the RFID tag is determined to be true (YES at S301), the server 30 performs identifying communication parameters (S302). For example, the identifying unit 322 of the server 30 identifies a corresponding supply ID, by matching the tag ID that have been obtained by the first obtaining unit 321, to the tag IDs recorded in the memory device 31. More specifically, the identifying unit 322 accesses the supply master database (see FIG. 8) to identify a supply ID in the "Supply ID" field associated with the tag ID in the parameter request data (which is hereinafter called "target supply ID").

The identifying unit 322 of the server 30 accesses the printer master database (see FIG. 7) to identify a record associated with the printer serial code in the parameter request data (which is hereinafter called "target printer model record").

The identifying unit 322 refers to the target printer model record to identify a "Communication parameters" field associated with the target supply ID. The identifying unit 322 identifies communication parameters (read parameters or write parameters) in a field corresponding to a type of communication from the "Read parameter" field and the "Writer parameter" field of the "Communication parameter" field which have been identified.

That is, the identifying unit 322 of the server 30 identifies communication parameters by matching: the target supply ID; and the printer serial code that have been obtained by the first obtaining unit 321, to the supply IDs and the printer serial codes recorded in the memory device 31.

After the step S302, the server 30 performs a parameter response (S303). Specifically, the identifying unit 322 of the server 30 accesses the user information database (see FIG. 6) to identify a user name associated with the tag ID contained in the parameter request data.

The first transmission unit 323 of the server 30 transmits the parameter response data to the printer 10. The parameter response data contains:
Supply property information that have been identified at the step S300;
Communication parameters that have been identified at the step S302; and
User name that have been identified at the step S303.

After the step S303, the printer 10 displays a screen (S104). Specifically, the second obtaining unit 121 of the printer 10 obtains the parameter response data transmitted from the server 30 at the step S303. The processor 12 is configured to display a screen P102 (see FIG. 12B) on the display device based on the parameter response data.

Figure 12B:
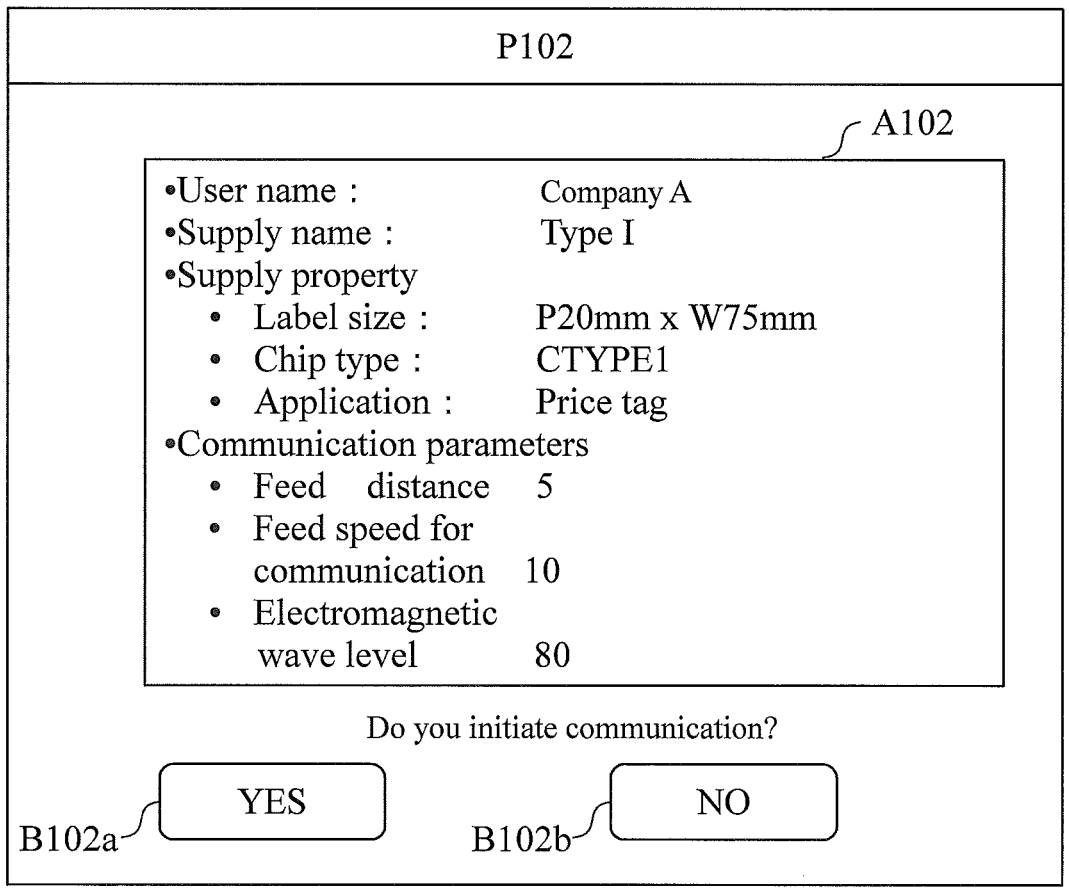

As illustrated in FIG. 12B, the screen P102 includes a display object A102 and button objects B102a to B102b.

The display object A102 contains: information regarding a user name in the parameter response data; a supply name; supply property information (a label size, a chip type, and information regarding an application, for example); and communication parameters (a feed distance, a feed speed for communication, and an electromagnetic wave level, for example).

The button object B102a receives a user instruction to initiate communication. The button object B102b receives a user instruction to terminate communication.

After the step S104, the printer 10 performs RFID communication (S105). Specifically, when a user operates the button object B102a (see FIG. 12), the processor 12 receives a user instruction to initiate RFID communication.

The processor 12 initiates a RFID communication sequence in response to the user instruction. Specifically, the communication controller 122 of the printer 10 records the communication parameters, which is contained in the parameter response data, in the memory device 11.

The driver circuit 15 generates a drive signal for the platen roller 150 to rotate the platen roller 150, which allows a belt-shaped print medium P to be extracted from a paper roll R in the storage 16.

The communication controller 122 of the printer 10 generates a communication control signal for controlling the reader/writer 152 based on the communication parameters recorded in the memory device 11. The communication control signal has a signal wave corresponding to a feed distance, a feed speed for communication, and an electromagnetic wave level, which are contained in the communication parameters.

The reader/writer 152 performs RFID communication in accordance with the communication control signal that have been generated by the communication controller 122 of the printer 10.

After the step S105, the printer 10 performs a log update request (S106). Specifically, the processor 12 transmits log update request data to the server 30.

The log update request data contains:
Printer serial code of the printer 10; and
Number of RFID tags RT that have been targetted for the RFID communication (S105).

After the step S106, the server 30 performs update for the database (S304). Specifically, the record unit 320 of the server 30 updates values in a field ("Read log" field or "Write log" field) that corresponds to a type of RFID communication, in the printer information database (see FIG. 9) associated with a printer serial code in the log update request data, such that:
The supply serial information that have been identified in the step S300 is stored in the "Supply serial" field; and
A number of RFID tags RT in the log update request data is added to the value in the Read log" field or the "Write log" field.

As described above, the server 30 transmits communication parameters to the printer 10 (S303). The transmitted communication parameters correspond to a combination of the printer 10 and the RFID tag RT. The printer 10 does not perform calibration, but records the communication parameters, which have been transmitted from the server 30, in the memory device 11 (S105).

This allows proper communication parameters setting to be easily performed in the RFID communication.

The server 30 transmits supply property information to the printer 10. The transmitted supply property information is associated with a tag ID that have been obtained from the printer 10. The printer 10 displays the supply property information that have been transmitted from the server 30. Thereby, property of print medium P containing a RFID tag used by a user can be presented to the user.

The server 30 matches the tag ID that have been obtained from the printer 10, to tag IDs recorded in the supply master database (see FIG. 8), thereby enabling judgment as to whether the RFID tag RT used by the user is true or not.

(4-2) Error Registration Processing

Figure 13:
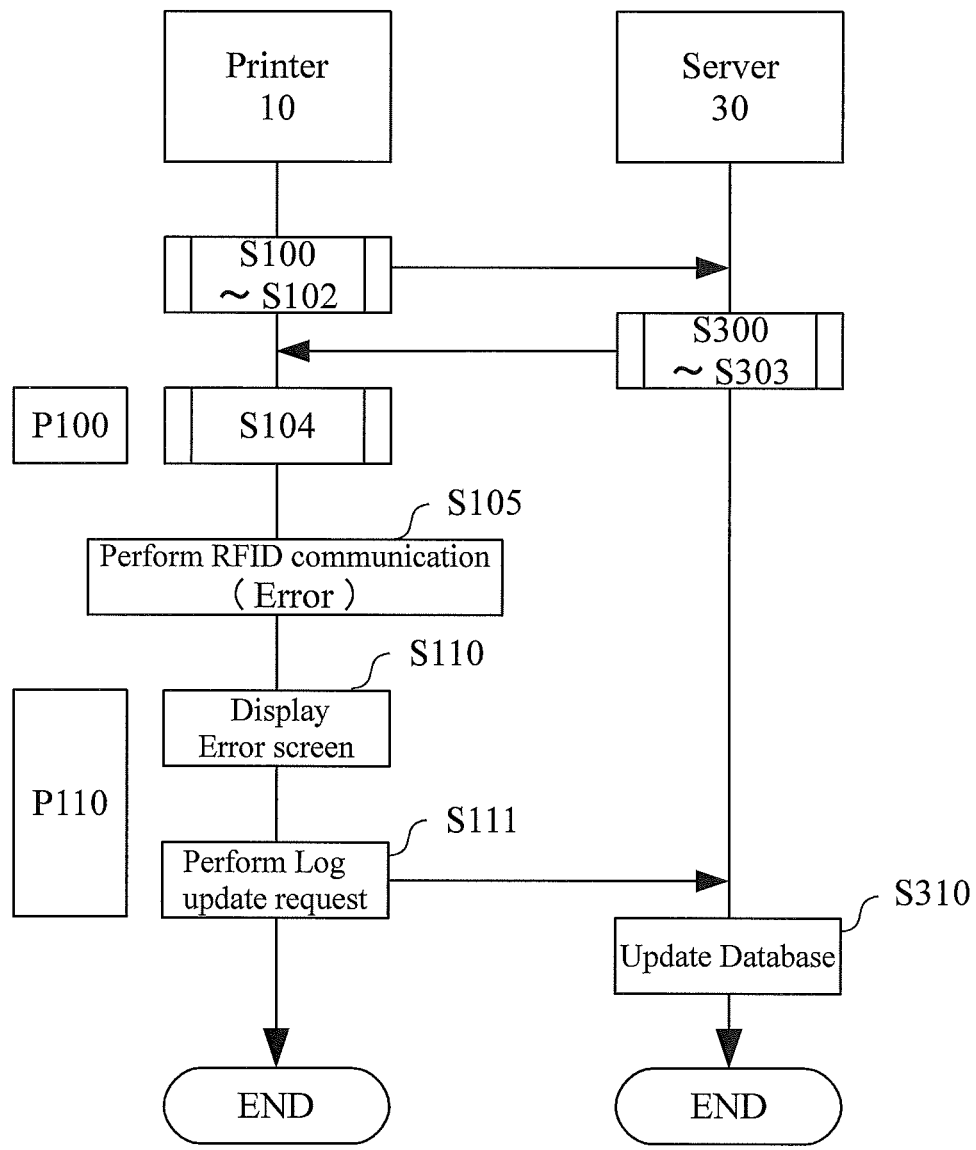
FIG. 13 is a sequence chart of error registration processing of the present embodiment.
Figure 14:
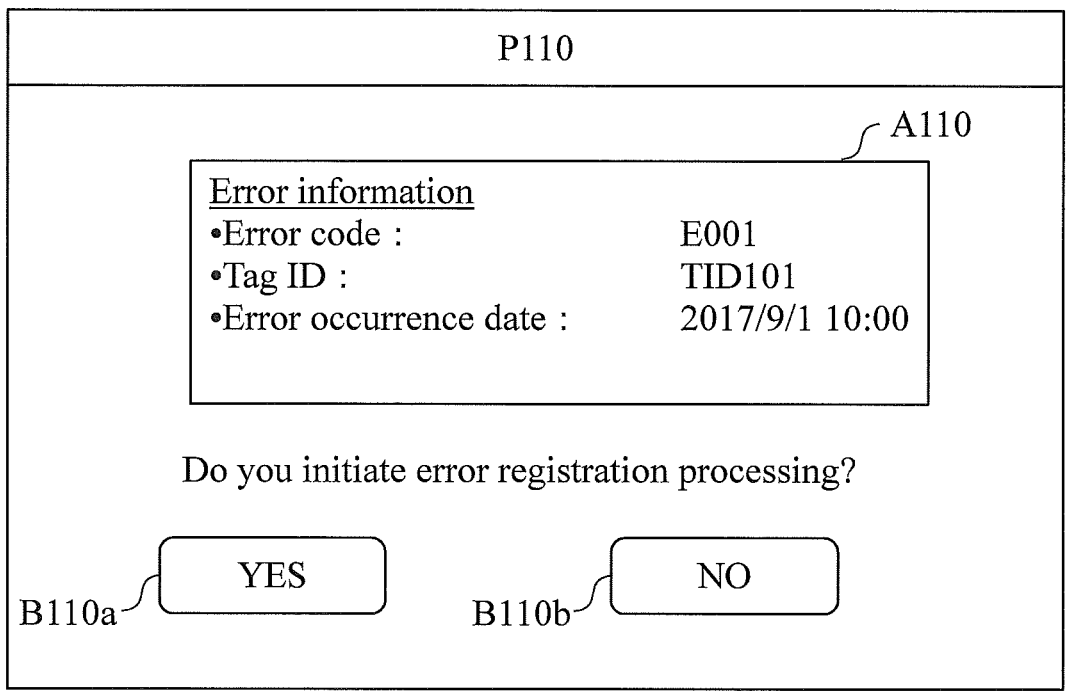
FIG. 14 illustrates an example of a screen displayed during the processing of FIG. 13.

Error registration processing according to the present embodiment will be described. FIG. 13 is a sequence chart of error registration processing of the present embodiment. FIG. 14 illustrates an example of a screen displayed during the processing of FIG. 13.

When an error occurs in step S105 of FIG. 11, the printer 10 performs displaying an error screen (S110). Specifically, the processor 12 displays a screen P110 (FIG. 14) on the display device.

As illustrated in FIG. 14, the screen P110 includes a display object A110 and button objects B110*a* to B110*b*.

The display object A110 includes the error code occurred in the step S105, the tag ID of the RFID tag RT targeted in the RFID communication (S105), and an error occurrence date.

The button object B110*a* is an object for receiving a user instruction to initiate error registration processing. The button object B110*b* is an object for receiving a user instruction to terminate error registration processing.

After the step S110, the printer 10 performs a log update request (S111). Specifically, when a user operates the button object B110*a*, the processor 12 transmits log update request data to the server 30. The log update request data contains:
  Printer serial code of the printer 10;
  Error code of the error that occurred at the step S105;
  Tag ID of the RFID tag RT that was used when the error occurred at the step S105; and
  information regarding an error occurrence date of the error that occurred at the step S105.

After the step S111, the server 30 performs database update (S310). Specifically, the identifying unit 322 of the server 30 accesses the supply master database (FIG. 8) to identify supply serial information of the "Supply serial" field associated with the tag ID in the log update request data.

The record unit 320 of the server 30 accesses the printer information database (FIG. 9) associated with the printer serial code in the log update request data, and updates the printer information database such that:
  Information regarding an error occurrence date in the log update request data is stored in the "Error occurrence date" field;
  The supply serial information that have been identified is stored in the "Supply serial" field; and
  Error code(s) in the log update request data are stored in the "Error code" field.

(5) Modified Examples

Modified examples of the present embodiment will be described.

(5-1) Modified Example 1

Modified example 1 of the present embodiment will be described. The modified example 1 represents an example of the server 30 that transmits communication parameters to the printer 10. The communication parameters corresponds to a combination of the printer 10, the RFID tag RT, and user property.

A database according to the modified example 1 will be described. FIG. 15 illustrates a data structure of a printer master database of the modified example 1.

The database of FIG. 15 is different from that of FIG. 7 in terms that the database of FIG. 15 has a "User property" field.

The "User property" field holds user property information regarding property of a user. The "User property" field includes a "Business category" field and a "Use location" field. The "Business category" field holds information regarding a business category of a user. The "Use location" field holds information regarding a use location of the printer 10.

RFID communication is influenced by a use condition by a user. For example, the user condition may include an application of the RFID tag RT or environment in which the printer 10 is used, such as a temperature of a location where the printer 10 is used. With the modified example 1, communication parameters are recorded in the memory device 31 for each combination of a printer model ID, a supply ID, and user property information. Thus, communication parameters can be provided to the printer 10 in accordance with a combination of a printer model, a type of the print medium P, and user property, thereby reducing influence of a use condition by a user.

User property information regarding property of a user of the printer 10 is recorded in the memory device 11 of the modified example 1. The user property information is set by a user as appropriate.

At the step S101 (see FIG. 11), the second obtaining unit 121 of the printer 10 obtains the user property information recorded in the memory device 11.

At the step S102, the second transmission unit 120 of the printer 10 transmits parameter request data to the server 30. The parameter request data contains:
  Printer serial code that have been obtained by the second obtaining unit 121 of the printer 10 at the step S101;
  Tag ID that have been obtained by the second obtaining unit 121 of the printer 10 at the step S101; and
  User property information that have been obtained by the second obtaining unit 121 of the printer 10 at the step S101.

At the step S302, the identifying unit 322 of the server 30 accesses the printer master database (FIG. 15) to identify a target printer record and to then identify user property information in the "User property" field of the target printer record.

In the target printer record, the identifying unit 322 of the server 30 identifies communication parameters associated with the user property information.

According to the modified example 1, RFID communication is performed by use of communication parameters optimized for property of a user. Thereby, communication parameter setting adapted to user circumstance such as use location can be easily performed.

(5-2) Modified Example 2

Modified example 2 of the present embodiment will be described. The modified example 2 represents an example of the server 30 that transmits communication parameters to the printer 10. The communication parameters corresponds to a combination of the printer 10, the RFID tag RT, and printer configuration.

(5-2-1) Printer Master Database

A database according to the modified example 2 will be described. FIG. 16 illustrates a data structure of a printer master database of a modified example 2.

The database of FIG. 16 is different from that of FIG. 7 in terms that the database of FIG. 15 has a "Optional configuration" field.

The "Optional configuration" field holds optional configuration information regarding optional configuration of the printer 10. The "Optional configuration" field includes a "Cutter unit ID" field, a "Separation unit ID" field, and a "Wireless communication unit ID" field.

The "Cutter unit ID" field holds a cutter unit ID for identifying a cutter unit 155 attached to the printer 10. The "Separation unit ID" field holds a separation unit ID for identifying a separation unit 154 attached to the printer 10. The "Wireless communication unit ID" field holds a wireless communication unit ID for identifying a wireless communication unit 153 attached to the printer 10.

Each subfield (namely, each of the "Feed distance" field, the "Feed speed for communication" field, and the "Electromagnetic wave level" field) of the "Communication parameters" field is associated with each subfield (namely, each of the "Cutter unit ID" field, the "Separation unit ID" field, and the "Wireless communication unit ID" field) of the "Optional configuration" field.

Each subfield of the "Communication parameters" field holds optimized communication parameters for configuration of the printer 10.

RFID communication is influenced by an optional configuration (the separation unit 154, for example) of the printer 10. For example, it is influenced by a conductive member of metal portions or the like of the separation unit 154. With the modified example 2, communication parameters are recorded in the memory device 31 for each combination of a printer model ID, a supply ID, and optional configuration information. Thus, communication parameters can be provided to the printer 10 in accordance with a combination of a printer model, a type of the print medium P, and optional configuration, thereby reducing influence of optional configuration.

(5-2-2) Information Processing

Information processing according to the modified example 2 will be described.

(5-2-2-1) Optional Configuration Processing

Figure 17:
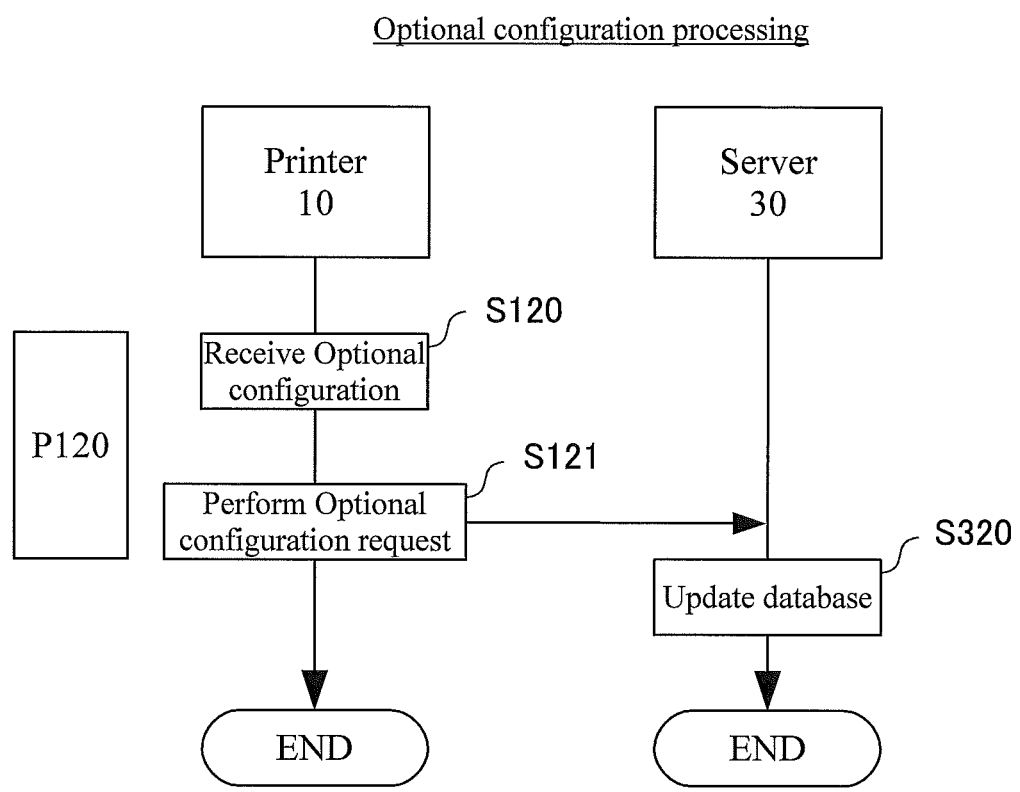
FIG. 17 is a sequence chart of option set processing of the modified example 2.
Figure 18:
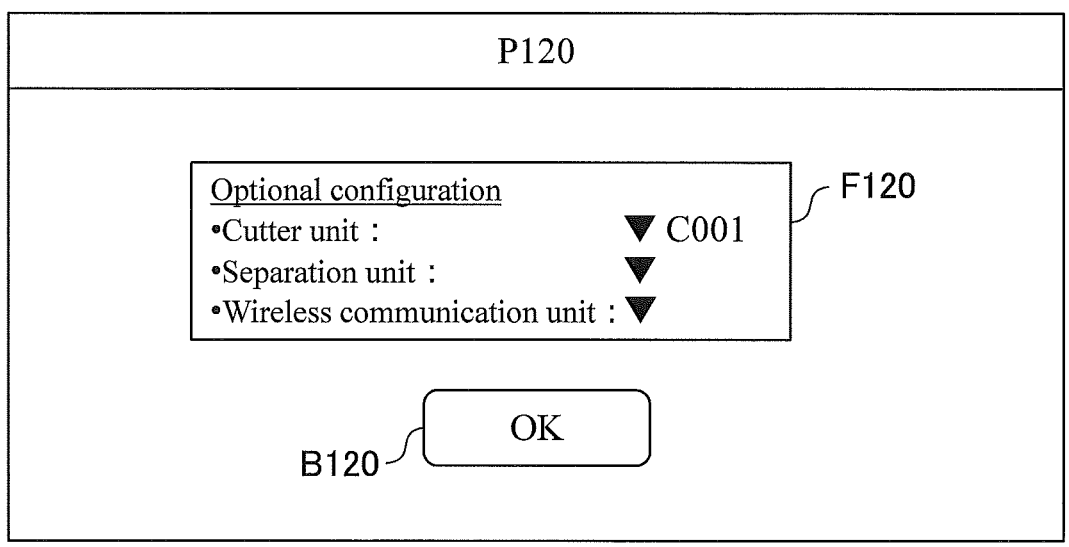
FIG. 18 illustrates an example of a screen displayed during the processing of FIG. 17.

Optional configuration processing of the modified example 2 will be described. FIG. 17 is a sequence chart of option set processing of the modified example 2. FIG. 18 illustrates an example of a screen displayed during the processing of FIG. 17.

As shown in FIG. 17, the printer 10 performs reception of optional configuration (S120). Specifically, the processor 12 displays a screen P120 (FIG. 18) on the display device.

As illustrated in FIG. 18, the screen P120 includes a button object B120 and an input filed object F120.

The input filed object F120 is an object for receiving optional configuration information regarding optional configuration such as: a cutter unit ID of the cutter unit 155, a separation unit ID of the separation unit 154, and a wireless communication unit ID of the wireless communication unit 153.

The button object B120 is an object for receiving a user instruction to initiate an option parameters request (S121).

After the S120, the printer 10 performs an option parameters request (S121). Specifically, when a user inputs optional configuration information into the input filed object F120 of FIG. 18 and operates the button object B120, the processor 12 transmits option parameters request data to the server 30. The option parameters request data contains:

Printer serial code of the printer 10; and
Optional configuration information inputted into the input filed object F120.

After the step S121, the server 30 performs database update (S320). Specifically, the record unit 320 of the server 30 accesses the printer information database (FIG. 9) associated with a printer serial code in the option parameters request data, and records optional configuration information (namely, a cutter unit ID of the cutter unit 155, a separation unit ID of the separation unit 154, and a wireless communication unit ID of the wireless communication unit 153) contained in the option parameters request data, in each subfield of the "Optional configuration" field.

(5-2-2-2) Write Processing

Write processing according to the modified example 2 will be described.

At the step S302 (see FIG. 11), the server 30 according to the modified example 2 identifies information contained in the "Optional configuration" field associated with a printer serial code in the parameters request data (that is, optional configuration data regarding optional parts attached to the printer 10).

The server 30 identifies a target printer record in the printer master database (FIG. 16), and then identifies communication parameters associated with the optional configuration data, in the target printer records that have been identified.

With the modified example 2, RFID communication is performed by use of communication parameters optimized for configuration of the printer 10, thereby reducing probability of error occurrence in the RFID communication.

(5-3) Modified Example 3

Modified example 3 of the present embodiment will be described. The modified example 3 represents an example to facilitate an order for a print medium P containing a RFID tag RT in accordance with use frequency of the RFID tag RT.

The server 30 of the modified example 3 is configured to calculate communication frequency for each supply ID based on information contained in the "Read frequency" field and the "Write frequency" field of the printer information database (FIG. 9).

The server 30 is configured to calculate a remaining amount of a RFID tag RT identified by each supply ID. If the calculated remaining amount is equal to or less than a predetermined value, the server 30 transmits purchase facilitation information to a predetermined contact (for example, a contact identified by information that a "Contact" field holds). The purchase facilitation information is for facilitating an order for the print medium P.

With the modified example 3, the server 30 manages a remaining amount of each RFID tag RT, and transmits purchase facilitation information to a predetermined contact when that amount becomes small. Thereby, a user is encouraged to purchase a RFID tag RT at a proper time.

(5-4) Modified Example 4

Modified example 4 of the present embodiment will be described. The modified example 4 represents an example of the server 30 that identifies communication parameters to be transmitted to a printer 10, based on a combination of user identification information and tag identification information.

A user ID of a user using the printer 10 is stored in the memory device 11 according to the modified example 4.

Single printer serial information is stored in the printer information database (FIG. 9). That is, a single user uses only one printer 10. In other words, a number of records of the printer information database is one.

At the step S101 (FIG. 11), the second obtaining unit 121 of the printer 10 obtains a user ID recorded in the memory device 11.

At the step S102, the second transmission unit 120 of the printer 10 transmits parameters request data to the server 30. The parameters request data contains:

User ID that have been obtained by the second obtaining unit 121 of the printer 10 at the step S101; and Tag ID that have been obtained at the step S101.

At the step S302, the identifying unit 322 of the server 30 accesses the printer information database (FIG. 9) associated with the user ID in the parameters request data to identify a printer serial code of the printer 10.

The identifying unit 322 of the server 30 accesses the printer master database (FIG. 7) to identify a target printer record associated with the printer serial code that have been identified.

Processes thereafter may be the same as those in the present embodiment (FIG. 11).

Even when the printer 10 transmits user identification information in exchange of printer identification information to the server 30, the modified example 4 exerts the same advantageous effect as the present embodiment.

(5-5) Modified Example 5

Modified example 5 of the present embodiment will be described. The modified example 5 represents an example of the server 30 that transmits communication parameters associated with a printer serial code and a tag ID, to the printer 10.

(5-5-1) Printer Master Database

A printer master database according to the modified example 5 will be described. FIG. 19 illustrates a data structure of a printer master database of a modified example 5.

The database of FIG. 19 is different from that of FIG. 7 in terms that the database of FIG. 19 contains a "Tag ID" field in exchange of the "Supply ID" field (FIG. 7). The "Tag ID" field holds a tag ID.

(5-5-2) RFID Communication Processing

RFID communication processing according to the modified example 5 will be described.

At the step S302 (see FIG. 11), the identifying unit 322 of the server 30 accesses the printer master database (FIG. 7) to identify a "Communication parameters" field associated with a printer serial code and a tag ID in the parameters request data. The step 302 may be performed every time RFID communication is performed with a RFID tag.

Processes thereafter may be the same as those in the present embodiment (FIG. 11).

Even when the server 30 does not manage supply IDs, the modified example 5 easily enables proper communication parameters setting for RFID communication.

(6) Other Modified Examples

The memory device 11 may be connected to the printer 10 through the network NW. The memory device 31 may be connected to the server 30 through the network NW.

An example has been disclosed in the present embodiment in which communication parameters and print parameters are associated with a supply ID in the printer master database (FIG. 7). In other example, communication parameters and print parameters may be associated with a tag ID.

An embodiment according to the present invention has been described in detail; however, it should be noted that the present invention is not limited to the embodiment described above. The embodiment described above may be improved or revised in a variety of ways in such a manner that does not depart from the spirit of the present invention. The embodiment and the modified examples described above may be combined. The present invention may include a computer-readable recording media (including non-volatile type) in which a program is recorded.

1: Information processing system
10: Printer
11: Memory device
12: Processor
120: Second transmission unit
121: Second obtaining unit
122: Communication controller
13: Input/output interface
14: Communication interface
15: Driver circuit
16: Storage
30: Server
31: Memory device
32: Processor
320: Record unit
321: First obtaining unit
322: Identifying unit
323: First transmission unit
33: Input/output interface
34: Communication interface
150: Platen roller
151: Thermal head
152: Reader/writer
153: Wireless communication unit
154: Separation unit
155: Cutter unit

The invention claimed is:

1. A server for setting radio frequency identification (RFID) communication parameters for at least one printer, such that the at least one printer performs RFID communication with a RFID tag using the RFID communication parameters, the server comprising a first processor configured to:

record, in a memory device, printer identification information for identifying a printer, tag identification information for identifying a RFID tag, and communication parameters with which the printer performs RFID communication, in an associated manner, the communication parameters comprising at least one of feed distance, feed speed, or electromagnetic wave level;

obtain, from the printer, printer identification information and tag identification information read by the printer;

identify the communication parameters associated with the printer identification information and the tag identification information obtained by the first processor; and transmit the communication parameters identified by the first processor, to the printer.

2. The server according to claim 1, wherein the first processor is configured to determine true or false regarding the RFID tag by matching the tag identification information obtained by the first processor, to the tag identification information recorded in the memory device.

3. A The printer capable of communicating with the server according to claim 1, the printer comprising a second processor configured to:
  obtain printer identification information assigned to the printer and tag identification information of a RFID tag with which the printer communicates;
  transmit the printer identification information and the tag identification information obtained by the second processor, to the server; and
  perform RFID communication with the RFID tag in accordance with communication parameters transmitted by the server.

4. A server for setting radio frequency identification (RFID) communication parameters for at least one printer, such that the at least one printer performs RFID communication with a RFID tag using the RFID communication parameters, the server comprising a processor configured to:
  record, in a memory device, printer identification information for identifying a printer, print medium identification information for identifying a print medium containing a plurality of RFID tags, and communication parameters with which the printer performs RFID communication, in an associated manner, the communication parameters comprising at least one of feed distance, feed speed, or electromagnetic wave level;
  obtain, from the printer, printer identification information and tag identification information read by the printer;
  Identify the print medium identification information that is associated with the tag identification information obtained by the processor, and identify the communication parameters that are associated with the identified print medium identification information and the printer identification information obtained by the processor; and
  transmit the communication parameters identified by the processor, to the printer.

5. The server according to claim 4, wherein the processor is configured to record the tag identification information and the print medium identification information in the memory device in an associated manner, and wherein the processor is configured to identify the print medium identification information by matching the tag identification information obtained by the processor, to the tag identification information recorded in the memory device.

6. The server according to claim 5, wherein the processor is configured to determine true or false regarding the RFID tag by matching the tag identification information obtained by the processor, to the tag identification information recorded in the memory device.

7. The server according to claim 5, wherein the processor is configured to identify the communication parameters by matching the identified print medium identification information and the printer identification information obtained by the processor, to the print medium identification information and the printer identification information recorded in the memory device.

8. The server according to claim 7,
  wherein the processor is configured to record user property information regarding property of a user using the printer, the printer identification information, the print medium identification information, and the communication parameters, in an associated manner,
  wherein the processor is configured to obtain, from the printer, the printer identification information, the tag identification information, and user property information, and
  wherein the processor is configured to identify the communication parameters that are associated with the identified print medium identification information, and the printer identification information and the user property information obtained by the processor.

9. The server according to claim 7, wherein the processor is configured to record the print medium identification information and print medium property information in an associated manner in the memory device, the print medium property information being information regarding property of a print medium containing a RFID tag,
  wherein the processor is configured to identify the print medium property information that is associated with the print medium identification information obtained by the processor, and
  wherein the processor is configured to transmit the print medium property information identified by the processor, to the printer.

10. The server according to claim 7, wherein the processor is configured to record the printer identification information, the print medium identification information, optional configuration information regarding optional parts attached to the printer, and the communication parameters, in an associated manner, and
  wherein the processor is configured to identify the optional configuration information associated with the printer identification information obtained by the processor; and to identify the communication parameters associated with the printer identification information obtained by the processor and the identified optional configuration information.

11. The server according to claim 4,
  wherein the processor is configured to record user property information regarding property of a user using the printer, the printer identification information, the print medium identification information, and the communication parameters, in an associated manner,
  wherein the processor is configured to obtain, from the printer, the printer identification information, the tag identification information, and user property information, and
  wherein the processor is configured to identify the communication parameters that are associated with the identified print medium identification information, and the printer identification information and the user property information obtained by the processor.

12. The server according to claim 11, wherein the processor is configured to record the print medium identification information and print medium property information in an associated manner in the memory device, the print medium property information being information regarding property of a print medium containing a RFID tag,
  wherein the processor is configured to identify the print medium property information that is associated with the print medium identification information obtained by the processor, and
  wherein the processor is configured to transmit the print medium property information identified by the processor, to the printer.

13. The server according to claim 11, wherein the processor is configured to record the printer identification information, the print medium identification information, optional configuration information regarding optional parts attached to the printer, and the communication parameters, in an associated manner, and
  wherein the processor is configured to identify the optional configuration information associated with the printer identification information obtained by the processor; and to identify the communication parameters associated with the printer identification information obtained by the processor and the identified optional configuration information.

14. The server according to claim 4, wherein the processor is configured to record the print medium identification information and print medium property information in an associated manner in the memory device, the print medium property information being information regarding property of a print medium containing a RFID tag,
  wherein the processor is configured to identify print medium property information that is associated with the print medium identification information obtained by the processor, and
  wherein the processor is configured to transmit the print medium property information identified by the processor, to the printer.

15. The server according to claim 14, wherein the print medium property information includes at least one of: a type of a label including the RFID tag; a type of an IC chip of the RFID tag; a type of a RFID inlay; or an application of the RFID tag.

16. The server according to claim 14, wherein the processor is configured to record the printer identification information, the print medium identification information, optional configuration information regarding optional parts attached to the printer, and the communication parameters, in an associated manner, and
  wherein the processor is configured to identify the optional configuration information associated with the printer identification information obtained by the processor; and to identify the communication parameters associated with the printer identification information obtained by the processor and the identified optional configuration information.

17. The server according to claim 4,
  wherein the processor is configured to record the printer identification information, the print medium identification information, optional configuration information regarding optional parts attached to the printer, and the communication parameters, in an associated manner, and
  wherein the processor is configured to identify the optional configuration information associated with the printer identification information obtained by the processor; and
  to identify the communication parameters associated with the printer identification information obtained by the processor and the identified optional configuration information.

18. The server according to claim 4, wherein the processor is configured to determine true or false regarding the RFID tag by matching the tag identification information obtained by the processor, to tag identification information recorded in the memory device.

19. A non-transitory computer-readable recording medium having a program stored therein, the program configured to cause a computer to perform a method in a server for setting radio frequency identification (RFID) communication parameters for at least one printer, such that the at least one printer performs RFID communication with a RFID tag using the RFID communication parameters, the method comprising:
  recording, in a memory device, printer identification information for identifying a printer, tag identification information for identifying a RFID tag, and communication parameters with which the printer performs RFID communication, in an associated manner, the communication parameters comprising at least one of feed distance, feed speed, or electromagnetic wave level;
  obtaining, from the printer, printer identification information and tag identification information read by the printer;
  identifying the communication parameters associated with the printer identification information and the tag identification information that have been obtained; and
  transmitting the communication parameters that have been identified, to the printer.

20. A non-transitory computer-readable recording medium having a program stored therein, the program configured to cause a computer to perform a method in a printer capable of communicating with a server, the printer performing radio frequency identification (RFID) communication with a RFID tag using RFID communication parameters, the method comprising:
  obtaining printer identification information assigned to the printer and tag identification information of the RFID tag with which the printer communicates;
  transmitting the printer identification information and the tag identification information that have been obtained, to the server; and
  performing the RFID communication with the RFID tag in accordance with communication parameters received from the server, the communication parameters comprising at least one of feed distance, feed speed, or electromagnetic wave level.

21. A server for setting radio frequency identification (RFID) communication parameters for at least one printer, such that the at least one printer performs RFID communication with a RFID tag using the RFID communication parameters, the server comprising a processor configured to:
  record, in a memory device, printer identification information for identifying a printer, print medium identification information for identifying a print medium containing a plurality of RFID tags, and communication parameters with which the printer performs RFID communication, in an associated manner;
  obtain, from the printer, printer identification information and tag identification information read by the printer;
  identify the print medium identification information that is associated with the tag identification information obtained by the processor, and
  identify the communication parameters that are associated with the identified print medium identification information and the printer identification information obtained by the processor;
  transmit the communication parameters identified by the processor, to the printer;
  record user property information regarding property of a user using the printer, the printer identification information, the print medium identification information, and the communication parameters, in an associated manner;
  obtain, from the printer, the printer identification information, the tag identification information, and user property information; and identify the communication parameters that are associated with the identified print medium identification information, and the printer identification information and the user property information obtained by the processor.

22. A server for setting radio frequency identification (RFID) communication parameters for at least one printer, such that the at least one printer performs RFID communication with a RFID tag using the RFID communication parameters, the server comprising a processor configured to:
   record, in a memory device, printer identification information for identifying a printer, print medium identification information for identifying a print medium containing a plurality of RFID tags, and communication parameters with which the printer performs RFID communication, in an associated manner;
   obtain, from the printer, printer identification information and tag identification information read by the printer;
   identify the print medium identification information that is associated with the tag identification information obtained by the processor, and identify the communication parameters that are associated with the identified print medium identification information and the printer identification information obtained by the processor;
   transmit the communication parameters identified by the processor, to the printer;
   record the printer identification information, the print medium identification information, optional configuration information regarding optional parts of the printer, and the communication parameters, in an associated manner;
   identify the optional configuration information associated with the printer identification information obtained by the processor; and
   identify the communication parameters associated with the printer identification information obtained by the processor and the identified optional configuration information.

\* \* \* \* \*